United States Patent [19]

Hamamura et al.

[11] Patent Number: 4,880,374

[45] Date of Patent: Nov. 14, 1989

[54] FILTER EXCHANGE DEVICE FOR AN EXTRUSION MOLDING MACHINE

[75] Inventors: Ken Hamamura; Sei Kawahara; Mitsuhiro Goto, all of Shizuoka, Japan

[73] Assignee: Fuji Photo Film Co., Ltd., Kanagawa, Japan

[21] Appl. No.: 196,406

[22] Filed: May 20, 1988

[30] Foreign Application Priority Data

May 20, 1987 [JP] Japan ............................ 62-121353

[51] Int. Cl.⁴ .............................................. B29F 3/06
[52] U.S. Cl. ............................... 425/185; 210/416.1; 210/435; 264/169; 425/197; 425/199
[58] Field of Search ............... 425/197, 198, 199, 185, 425/183, 190; 210/416.1, 258, 435; 264/176.1, 169, 85

[56] References Cited

U.S. PATENT DOCUMENTS

| | | | |
|---|---|---|---|
| 3,461,193 | 8/1969 | Gilardi | 264/85 |
| 3,503,096 | 3/1970 | Marianelli | 264/176.1 |
| 3,938,924 | 2/1976 | Abella et al. | 425/147 |
| 4,167,384 | 9/1979 | Shirato et al. | 425/183 |
| 4,202,659 | 5/1980 | Kinoshita | 425/183 |
| 4,395,212 | 6/1983 | Lambertus | 425/185 |
| 4,416,605 | 11/1983 | Konno et al. | 425/185 |
| 4,507,072 | 3/1985 | Gaul, Jr. | 425/185 |
| 4,725,215 | 2/1988 | Kreyenborg et al. | 425/185 |
| 4,752,386 | 6/1988 | Schulz et al. | 210/108 |

FOREIGN PATENT DOCUMENTS

| | | |
|---|---|---|
| 1258188 | 3/1969 | Fed. Rep. of Germany . |
| 2256639 | 11/1972 | Fed. Rep. of Germany . |
| 3017337 | 5/1980 | Fed. Rep. of Germany . |
| 57-2741 | 1/1982 | Japan . |
| 60-174627 | 9/1985 | Japan . |

OTHER PUBLICATIONS

Donovan, T. A., Modern Plastics Encyclopedia, p. 237; 1986–1987.
Aldroy, J. D., Modern Plastics Encyclopedia, pp. 268–269, 1982–1983.
Berlyn, G. E., Modern Plastics Encyclopedia, p. 231, 1983–1984.
Aldroy, J. P., Modern Plastics Encyclopedia, p. 233, 1984–1985.
Pittenger, F. L. Modern Plastics Encyclopedia, p. 236, 1985–1986.

Primary Examiner—Jay H. Woo
Assistant Examiner—Khanh P. Nguyen
Attorney, Agent, or Firm—Sughrue, Mion, Zinn, Macpeak & Seas

[57] ABSTRACT

A filter exchange device in a molten resin passage in an extrusion molding machine, which includes at least one filter casing for airtightly enclosing a spare filter and having port means for exhausting air out of the filter casing and filling the interior thereof with a gas inactive to molten resin. Fish eyes contained in the molded product after filter exchange reduced in number.

16 Claims, 3 Drawing Sheets

FILTER EXCHANGE DEVICE FOR AN EXTRUSION MOLDING MACHINE

BACKGROUND OF THE INVENTION

This invention relates to an exchange device for a filter provided in a molten resin extrusion passage of an extrusion molding machine for removing impurities included in the molten resin.

In processing thermoplastic resins into sheets or films by an extrusion molding machine (extruder), a variety of filters are employed in the passage of the molten resin, such as between an extruder head and a metal mold or die, for preventing impurities or deteriorated resin in the extruder from being mixed into the products.

For exchanging these filters, there is so far known a device in which, for continuous operation of the extruder, at least two filters are provided in a casing and alternately employed for filtration, with the flow of the molten resin being switched by a valve so that alternate filters are exchanged, or a device in which the filter is built into a so-called cassette slide which is caused to slide in a direction normal to an extruder screw shaft to take out the used and contaminated filter and introduce a new fresh filter into the stream of the molten resin.

These known devices are disclosed in, for example, the Japanese Patent KOKAI Publication Nos. 60-174627 or 57-2741.

However, when the molten resin is apt to be deteriorated in quality on contact with air, it is quite likely that ambient air will intrude into the extruder with installment of a new filter at the time of the filter exchange by the filter exchange device, so that oxides of the resin may be formed within the extruder.

It results in that these oxides are mixed into the product after the filter exchange to form fish eyes. By the term "fish eyes" are meant flaws or defects on the appearance of the molded product demarcated from that of the acceptable product and which is caused by the presence of impurities, unmolten resin or deteriorated resin in the extruder having been mixed into the molded products during extrusion molding. For possibly preventing the occurrence of these "fish eyes", it is necessary that various components of the extruder, such as the metal mold, die or piping be dismantled and rinsed completely, or the inner components of the extruder be cleaned and flushed by continuing the extrusion of the resin until complete disappearance of the fish eyes. This means a significant loss not only in the molten resin but in the operating time until re-initiation of the regular molding operation.

SUMMARY OF THE INVENTION

It is an object of the present invention to provide a filter exchange device for an extrusion molding machine according to which the aforementioned problems inherent in the above prior-art devices can be obviated.

For accomplishing the above object, the present invention provides a device for exchanging a filter provided in a molten resin passage of an extrusion molding machine, wherein the device comprises a filter casing for airtightly enclosing a pre-exchange filter, that is, a spare fresh filter to be exchanged, and port (or duct) means for exhausting air out of the filter casing and filling the interior of the filter casing with a gas inactive to the molten resin.

With the use of the filter exchange device of the present invention, the fish eye contents in the molded product obtained after filter exchange may be significantly reduced, so that the loss in the molded products and the operating time until re-initiation of the molding operation after the filter exchange is reduced with improvement in productivity and costs.

The filter casing (enclosure casing) for a pre-exchange filter may be a cover provided on the conventional filter exchange device, or a airtightly sealed casing enclosing a newly provided filter exchange device.

In a filter exchange device wherein two or more filter chambers are provided in the molten resin passage and the stream of the molten resin is changed over by a valve, any one of the filter chambers can be airtightly enclosed by valve changeover operation.

The ambient air around the pre-exchange filter, which is surrounded by a casing adapted for airtightly enclosing the pre-exchange filter, is exhausted through one or more ports or ducts provided on the casing through evacuation or purging. The interior of the casing is filled, or preferably repeatedly filled, with a gas inert to the extruded molded resin, or continuously circulated with such gas.

The gas inactive to the extruded molded resin may be selected as a function of the properties of the extruded molten resin. Thus it may be a gas such as $N_2$, or inert gas like Ne or Ar, when the molten resin is apt to be oxidized with atmospheric oxygen, such as polyethylene. It will be noted that air inflow from outside may be prevented when the pressure within the casing is maintained at slightly higher than the ambient pressure, even in cases wherein the casing is somewhat imperfect in air tightness.

In the exchange device of the present invention, two or more filter casings may be provided for alternate filter exchange for continuous extrusion molding operation or with minimum rest time for filter exchange, although at least one casing airtightly enclosing the pre-exchange filter usually suffices. For example, in the case of the conventional slide frame type filter exchange device, it is possible to provide a filter casing at a position where the pre-exchange filter is set and another casing at a position where the used filter is thrusted out, that is, a position where the pre-exchange filter is set at the time of the next filter exchange operation.

Each of the two or more filter casings may be airtight separately or in communication with other one or more casings.

In the exchange device of the present invention, a filter exchange opening is preferably provided to permit a facilitated filter exchange operation. Preferably, the opening should have good airtightness and be adapted to be opened or closed as desired.

The exchange device of the present invention may be provided with a filter supply section, a filter positioning means for positioning the filter to a predetermined position, a container section for used filters or a rinsing section for used filters. These sections or means may be provided with sensors, relays or timers to provide for automatic operation or may be controlled by a computer system.

Further preferred embodiments are set forth below which are defined in the appendent claims.

In the filter exchange device the filters are positionable into and out of the resin passage, and the filter casing airtightly encloses at least the spare filter so as to position the spare filter from a position outside the resin passage into a position in the resin passage without contacting ambient air.

The exchange device may comprise a first filter position adapted to be disposed in the resin passage and a second filter position adapted to be disposed outside the resin passage, and means for changing-over the first filter position out of the resin passage and the second filter position into the resin passage.

The filter exchange device may further comprise a second filter casing airtightly enclosing the first filter position which has been removed out of the resin passage and having second port means for exhausting air out of the second filter casing and filling the interior of the filter casing with the gas inactive to the molten resin.

The filter exchange device may include sliding means, as the positioning means, for changing-over the first and second filter positions out of and into the resin passage, respectively, or vice versa. The sliding means includes a sliding guide and a sliding frame which is slidably disposed along the sliding guide and provided with filter receiving bores at positions corresponding to said first and second filter positions. The sliding means includes stopper means for positioning the filter at a position aligned to the resin passage. The stopper means includes a stopper provided on the sliding frame and an end of the sliding guide associated with the stopper to abut to each other for positioning. The sliding means is operated by a hydraulic cylinder airtightly disposed throughout the filter casing.

A connecting conduit may be provided communicating the filter casing with the second filter casing. The filter casings are each provided with access means, e.g., a door, which is airtightly closed and opened for replacing the filter with a fresh filter out of and into the filter casing.

The port means more preferably includes at least two ports disposed so as to allow said gas to circulate the interior of the filter casing. The port means and the second port means are disposed so as to circulate said gas from one filter chamber to the other to be exhausted out of the other.

The filter exchange device may include:
a bypass passage bypassing the resin passage, said bypass passage having the spare filter disposed therein and being airtightly enclosed by said filter casing, and valve means for changing-over the extrusion passage for molten resin to the bypass passage, wherein the port means is selectively communicatable to an evacuating source or a source of said gas via valve means for switching connection with any one of said sources.

More preferably instead the extrusion passage for molten resin there is provided another bypass passage, this bypass passage having another filter disposed therein and being airtightly enclosed by another filter casing with port means for exhausting air out of said another filter casing and filling the interior of said another filter casing with the gas inactive to the molten resin.

DESCRIPTION OF THE PREFERRED EMBODIMENTS

Figure 1:
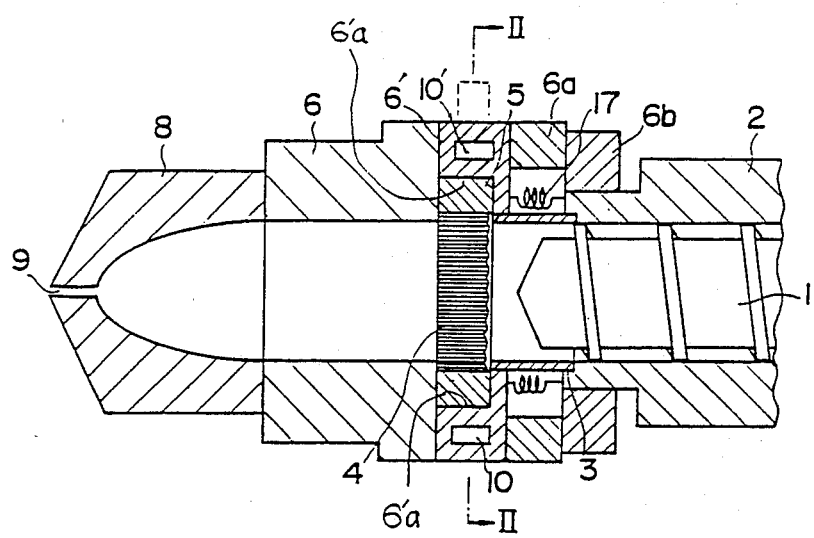
FIG. 1 is a sectional view of an embodiment of an extrusion molding machine provided with a filter exchange device of the present invention.

Referring to the drawings, illustrative examples of the present invention will be explained.

EXAMPLE 1

In FIGS. 1 to 4, there is shown a slide type filter exchange device built in an extrusion molding device, according to an embodiment of the present invention.

A screw 1 is revolved within a cylinder 2 for extruding the molten resin within the cylinder 2 through a tubular member 3, a filter 4 and the inside of a machine casing 6 into the inside of a metal mold (nozzle or die) 8. Center bores of the cylinder 2, tubular member 3, casing 6 amd mold 8 constitute a passage through which the molten resin is passed for extrusion. The metal mold is adapted for extruding the molten resin through an extruding orifice 9 to a desired ultimate shape.

The tubular member 3 is inserted and secured to an exit end of the center bore of the cylinder 2. The filter 4 is interposed between the downstream end of the tubular member 3 and the upstream end of the casing 6. A frame guide 6' which receives, in its center bore, the filter 4 is interposed between the tubular member 3 and the casing 6, the filter 4 extending throughout the entire crosssection of the bore serving as a part of the passage. The tubular member 3 is with its downstream end inserted in the center bore of the frame guide 6'. A compression spring 17 is interposed between the downstream end of the cylinder 2 and the upstream end of the frame guide 6'. The compression spring 17 urges the frame guide 6' toward a filter frame 5 which surrounds the filter 4 to tightly abut to the frame 5 thereby preventing leakage of the molten resin through a gap between the frame guide 6' and the filter frame 5. The spring 17 may be mounted in position or dismounted after transient removal of a spring exchange member 6a which is detachable against (and between) the frame guide 6' and a block 6b, the latter being mounted on the outer periphery of the cylinder 2.

The filter 4 is a mesh screen having a diameter corresponding to the diameter of the passage, i.e., here substantially the same as the outer diameter of the tubular member 3. The filter 4 is dismountably mounted in a bore provided on the filter frame 5 so as to after use permit easy exchange with a spare filter 13. The filter 4 is positioned coaxially with the axis of the tubular member 3 at a closest proximity to the downstream end thereof during the operation.

The filter frame 5 is made of a substantially rectangular plate having two (or more) circular bores 5c, 5c' to receive the filter 5 and the spare filter 13 along the longitudinal axis of the plate. Stoppers 5a and 5b are provided on the left and right side ends projecting up and down from the upper and lower contours of the plate, respectively. The filter frame 5 is slidably supported by the frame guide 6' so as to allow the filter frame 5 with its upper and lower contours to slide within "L" shaped grooves 6'a of the frame guide 6'. A piston rod 14a of a dual action hydraulic cylinder 14 is connected to one side end (right side end in FIG. 2) whereby the filter frame 5 is reciprocatedly moved in a plane normal to the axis of the screw 1 (namely, axis of the tubular member 3). At a most retracted position of the piston rod 14a (FIG. 2), the stopper 5a of the filter frame 5 is blocked by an end of the frame guide 6' on one side (left end in FIG. 2), so as to position the filter 4 in a coaxial, entirely overlapping alignment with the cross section of the tubular member 3. On the other hand at a most projected position of the piston rod 14a the filter 4 is moved into a left spare filter chamber 15' formed within a left cover (filter casing) 22' so as to position the spare filter 13, which was positioned in a right spare filter chamber 15 formed within a right cover (filter casing) 22, into a coaxial alignment with the tubular member 3, the positioning being secured by engagement of the right stoppers 5b of the filter frame 5 with another ends (right end in FIG. 2) of the frame guide 6'. The used filter 4 can be removed from the filter frame 5 now positioned in the left spare filter chamber 15'.

Namely, the frame 5 connected to the piston rod of the hydraulic cylinder 14 and is adapted to slide relative to the casing 6 and to the filter guide 6' which is a part of a filter casing 21 comprised of the filter guide 6', and covers 22 and 22'. Before operation, the frame 5 is positioned so that the (fresh) filter 4 is brought to a prescribed ordinary filter set position for removing impurities from the stream of the molten resin, and after the operation the (used) filter 4 is brought to a position for dismounting the used filter 4 from the frame 5 and mount a fresh filter (i.e., replacing the used filter by fresh one) while the spare (fresh) filter 13 is simultaneously brought into the ordinary filter set position for the next operation.

The dual action hydraulic cylinder 14 is airtightly mounted on the cover 22.

This cover 22 and another cover 22' are airtightly mounted to the machine casing 6 and to the filter guide 6' to form a filter casing 21 airtightly enclosing the filter 4, 13.

Figure 3:
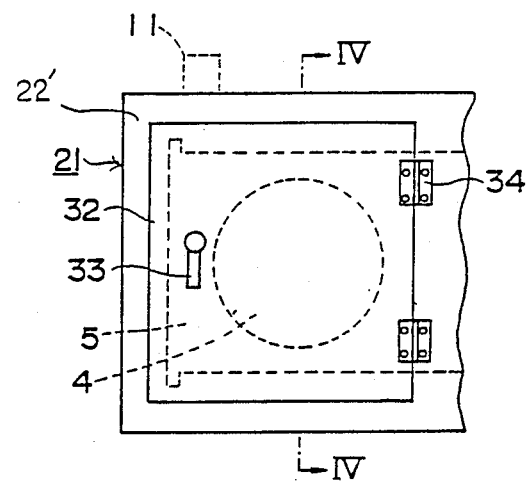
FIG. 3 is a perspective view showing the left half portion of FIG. 2.

A door 32 is disposed on at least one side of each of the covers 22, 22' (22' in FIG. 3). The door 32 may be opened and closed by a hinge 34 and a knob 33 for facilitated attachment and detachment of the filter onto and from the frame 5. The filter chambers 15, 15' are maintained airtight upon closure of the door 32.

Figure 4:
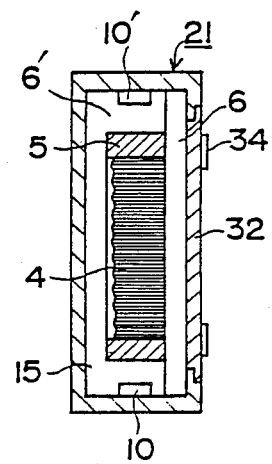
FIG. 4 is a sectional view taken on a line IV—IV of FIG. 3.

It should be noticed that, although the door is provided in FIG. 4 only on one side of the cover 22 (or filter casing 21), another door, not shown, may occasionally be provided to the other side of the cover 22' opposite to the door 32.

Referring to FIG. 1, which is a longitudinal section through an extrusion molding machine having the filter exchange device according to the present invention, the molded resin in the inside of the cylinder 2 is extruded by the screw 1 through the filter 4 and the metal mold (or die) 8 to an ultimate molded product, such as a sheet. At this time, the deteriorated resin or impurities within the screw extruder are accumulated on the filter 4 to raise the pressure within the cylinder 2 to cause leakage or changes in the discharge amount of the molten resin. In order to prevent this, the filter is replaced by fresh one when it is ascertained by a pressure meter, not shown, for measuring the pressure within the cylinder 2 that the pressure within the cylinder 2 reaches a predetermined valve. Here, the spare filter 13 shown in FIG. 2 has been previously set and the air inside the screw extruder is exhausted through a port 11 for establishing a vacuum or a reduced oxygen pressure within the filter chambers 15, 15', while an inactive gas, such as N₂, or inert gas like Ne or Ar, is introduced into the chambers 15, 15' through a port 12. Preferably, evacuation through the port 11 for lowering the pressure and introduction of the inactive gas through the port 12 are repeatedly performed for lowering the oxygen concentration within the filter chambers 15, 15'. The frame 5 is thrusted by the dual action hydraulic cylinder 14 for bringing and setting the filter 13 to the prescribed normal filter set position in alignment with the screw 1. In this manner, extrusion molding may be performed after the exchange of the filter without producing the so-called fish-eyes.

Figure 2:
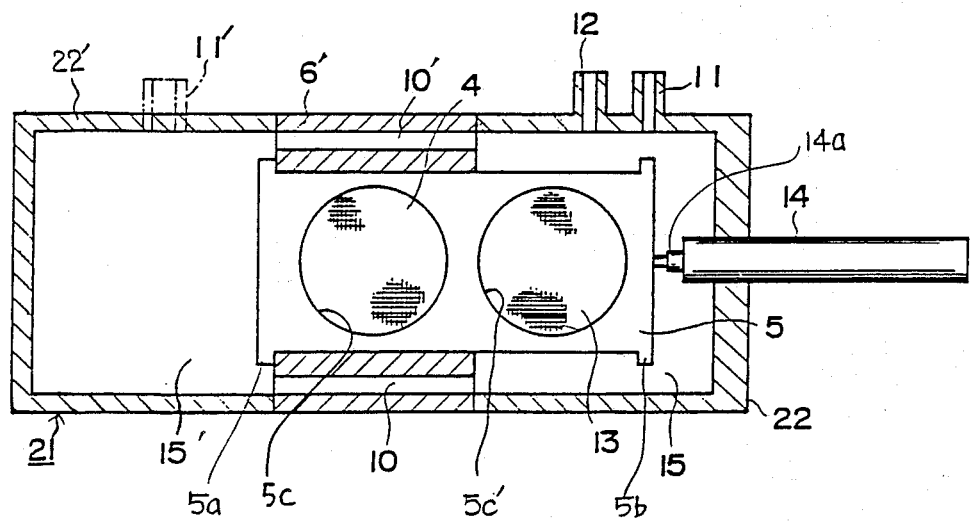
FIG. 2 is a sectional view taken on a line II—II of FIG. 1.

Referring to FIG. 2, the exchange device of the present invention may be comprised only of the right side half of the screen filter casing 21, i.e., the right filter chamber 15, eliminating communication ports 10, 10' communicating to the left side filter chamber 15'. The left side half of the filter chamber is provided in order to provide for continuous (i.e., alternate) exchange of the filters for continuous extruding operation.

The port 11 may also be provided at a portion indicated at 11' by a chain-dotted line in FIG. 2, in which case the air within the filter chambers 15, 15' may be efficiently discharged even when only the inactive gas is continuously supplied through the port 12 for purging.

In the foregoing, the ports 11 or 11' are used for evacuation while the port 12 is used for introducing the inactive gas. Alternatively, the ports 11 or 11' may be used for introducing the inactive gas while the duct 12 may be used for evacuation. Still alternatively, only one port may be used and switched between the evacuation and introduction of the inactive gas. When the ports 11' and 12 as described above are employed, continuous filter exchange may be performed efficiently.

In FIGS. 3 and 4, there is shown the door 32 having an improved air tightness such as is provided on the cover 22' of the filter exchange device shown in FIG. 2. Such door is also provided on the cover 22 of the filter exchange device.

Figure 5:
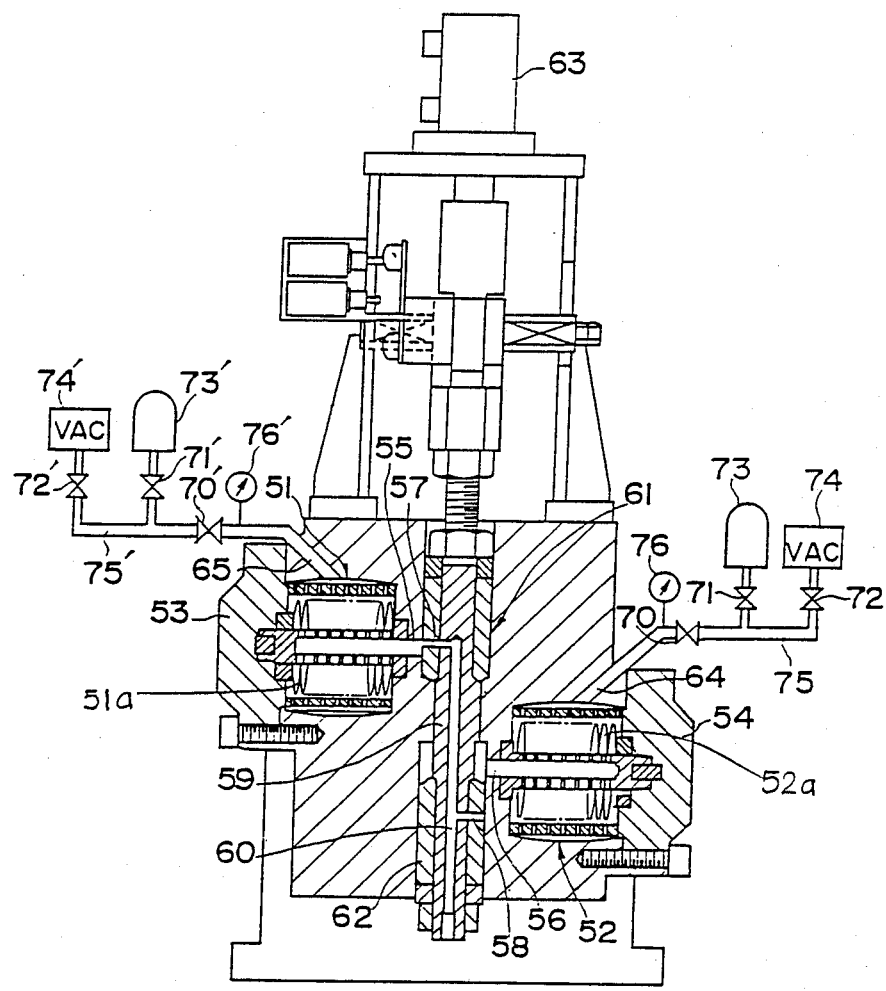
FIG. 5 is a sectional view of an filter exchange device according to a modified embodiment of the present invention.

In FIG. 5, there is shown in cross section a filter exchange device of a second embodiment having two filter chambers 51, 52 in a passage for molten resin, the filter chambers each receiving a filter (screen pack) 51a and 52a, respectively.

Referring to FIG. 5, molten resin is ready to flow into the filter chamber 51 through a molten resin changeover valve at its one position, not shown, with the resin flowing out of the filter 51a at a conduit 55. A spool 59 which is vertically slidable by a hydraulic cylinder 63 is provided with a center conduit 57 which is connectable/disconnectable to the conduit 55 depending on the position of spool 59. The resin flows out through the conduit 57 and a center conduit 60 at a resin exit opening, not shown.

In a mode as shown in FIG. 5, the molten resin is unable to flow into the filter chamber 52 by a molten resin changeover valve, not shown, at its one position. The filter chamber 52 is kept airtight, although it is connected to a gap between the casing and the spool 59 and a resin conduit 56.

Covers 53, 54 are provided removably and airtightly to the filter chambers 51, 52. These covers 53, 54 may be alternately removed for exchanging the filters 51a and 52a installed within the filter chambers 51 and 52, respectively.

The filter chamber 52 and the resin conduit 56 are cleaned and a new filter (screen pack) is installed in position, after which the cover 54 is mounted for securing airtightness.

The air within the filter chamber 52 is discharged through a duct 64 and a duct section 73 by a vacuum pump 74, while the inactive gas from a gas bombe 73 is introduced into the filter chamber 52, after which a valve 70 is closed for securing airtightness.

The supply of resin into the filter chamber 51 is terminated by closing the molten resin changeover valve, and another valve, not shown, disposed upstream of the resin exit opening (die) is closed, so that the resin remains charged in the resin conduits.

The spool 59 is slid upwards by the operation of the hydraulic cylinder 63 for connecting the conduits 58 and 56 to each other. The molten resin is then supplied into the filter chamber 52. It is noted that the sleeves 61, 62 may also be revolved about its axis to slide around the periphery of the spool 59 for valve opening and closure.

Subsequently, evacuation of air and filling with the inactive gas are conducted after replacement of the filter pack 51 in the filter chamber 51 by a fresh spare filter via duct 65 and a duct section 73' by means of a vacuum pump 74', valves 70', 71' and 72', a gas bomb 73' and a pressure gauge 76' otherwise analogously to the case with the filter chamber 52. This operation can be carried out during the extrusion molding procedure through the filter 52a.

Tests 1 and 2 employing the device of the first embodiment according to the present invention will be explained in comparison with a comparative test.

Test 1 refers to a case in which the filter exchange is performed while the inside of the screen filter chamber is evacuated and re-filled with nitrogen gas, and the test 2 refers to a case in which the screen filter exchange is performed while the inside of the screen filter chamber is evacuated and re-filled with nitrogen gas, with the operation of the evacuation and re-filling being repeated twice on end. The comparative test refers to a case in which the screen filter is exchanged while the screen filter chamber remains filled with air.

The molten resin employed for testing was selected among those which are oxidized easily when exposed to air. The resin was extruded into films each 30 cm in width. The film surface was observed visually after extrusion and the number of fish-eyes was counted for evaluation.

For testing, the polyethylene resin LDPE "Mirason 12" produced by Mitsui Sekiyu Kagaku Kogyo KK was employed. The extruder had a diameter of 65 mm and was revolved at a rotational speed of 200 r.p.m. The resin was extruded at a temperature of 320° C. with a discharge rate being 92 kg/Hr. Two superimposed screen meshes of #200 and #60 were employed.

The test results were as follows:

Test 1:

Nitrogen ($N_2$) gas was charged once. It was observed that 10 to 20 and 0 to 1 fish-eyes per minute occurred at the time of screen filter exchange and after the lapse of ten minutes, respectively.

Test 2:

Nitrogen gas was charged twice. It was observed that 3 to 5 and 0 to 1 fish eyes per minute occurred at the time of screen filter exchange and after the lapse of ten minutes, respectively.

Comparative Test $N_2$ gas was not charged. 0 to 1 fish eye was observed to occur during the normal operation. On the other hand, 100 to 300, and 50 fish eyes per minute were observed to occur at the time of screen filter exchange and after the lapse of 10 minutes, respectively.

It is apparent from above that the rate of occurrence of the fish eyes in the LDPE film obtained upon extrusion molding may be significantly reduced by charging the nitrogen gas into the screen filter chamber in accordance with the teaching of the present invention.

It should be noted that the modification may be done without departing form the gist and scope as herein disclosed and claimed hereinbelow.

What is claimed is:

1. A filter exchange device of an extrusion molding machine for exchanging a first filter provided in an extrusion passage for molten resin, comprising:
   a spare filter;
   a first filter casing airtightly enclosing said spare filter in a region outside said resin passage and having first port means for exhausting air out of the filter casing and filling the interior of the filter casing with a gas inert to the molten resin.

2. The filter exchange device as defined in claim 1, further comprising filter exchanging means for exchangeably positioning said first and spare filters into and out of said passage, wherein:
   said first filter casing airtightly encloses at least the spare filter so as to position the spare filter from a position outside the resin passage into a position in the resin passage without contacting ambient air.

3. The filter exchange device as defined in claim 2, wherein the filter exchange device further comprises a second filter casing airtightly enclosing the first filter when said first filter has been removed out of the resin passage and having second port means for exhausting air out of the second filter casing and filling the interior of the second filter casing with the gas inactive to the molten resin.

4. The filter exchange device as defined in claim 2, wherein the filter exchanging means comprises sliding means for slidably moving said first and spare filters out of and into the resin passage, respectively, or vice versa.

5. The filter exchange device as defined in claim 3, wherein there is provided a connecting conduit communicating the first filter casing with the second filter casing.

6. The filter exchange device as defined in claim 3, wherein the first and second filter casings are each provided with access means which is airtightly closed and opened for replacing the respective filter with a fresh filter out of and into the filter casing.

7. The filter exchange device as defined in claim 6, wherein said access means comprises a door.

8. The filter exchange device as defined in claim 4, wherein said sliding means includes a sliding guide and a sliding frame which is slidably disposed along the sliding guide and provided with filter receiving bores at positions corresponding to first and second filter positions in and out of said resin passage, respectively.

9. The filter exchange device as defined in claim 4, wherein said sliding means includes stopper means for positioning one of the filters at a position aligned to the resin passage.

10. The filter exchange device as defined in claim 9, wherein said stopper means includes a stopper provided on the sliding frame and an end of the sliding guide associated with the stopper to abut each other for positioning.

11. The filter exchange device as defined in claim 3, wherein each of said first and second port means includes at least two ports disposed so as to allow said gas to circulate within the interior of the filter casing.

12. The filter exchange device as defined in claim 5, wherein said first port means and said second port means are disposed so as to circulate said gas from one filter chamber to the other to be exhausted out of the other.

13. The filter exchange device as defined in claim 4, wherein said sliding means further comprises a hydraulic cylinder airtightly disposed throughout the filter casing.

14. A filter exchange device of an extrusion molding machine for exchanging first and second filters for one another, comprising:
 a casing having first and second passages formed therein and first and second filter-receiving chambers formed in said first and second passages, respectively;
 first and second filters disposed in said first and second chambers, respectively;
 valve means for applying a flow of molten resin to a selected one of said passages; and
 means for evacuating air from a one of said first and second chambers through which molten resin is not flowing and filling said one of said chambers with a gas inert to said molten resin.

15. The filter exchange device as defined in claim 14, wherein said valve means comprises a slidable spool valve coupled to outlets of said first and second passages.

16. The filter exchange device as defined in claim 15, wherein said spool valve comprises a slidable valve body slidably mounted in said casing, said valve body having formed therein a central longitudinal conduit and first and second lateral conduits, said first and second lateral conduits being selectively communicated with said outlets of said first and second passages, respectively, in dependence upon a longitudinal position of said valve body.

* * * * *